United States Patent
Lee et al.

(10) Patent No.: US 12,510,422 B2
(45) Date of Patent: Dec. 30, 2025

(54) ELECTRONIC DEVICE AND METHOD OF MEASURING AIR TEMPERATURE USING THE SAME

(71) Applicant: SAMSUNG ELECTRONICS CO., LTD., Suwon-si (KR)

(72) Inventors: So Young Lee, Suwon-si (KR); Sang Kyu Kim, Yongin-si (KR); Ho Taik Lee, Yongin-si (KR); Bok Soon Kwon, Seoul (KR); Sung Ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 701 days.

(21) Appl. No.: 17/901,265

(22) Filed: Sep. 1, 2022

(65) Prior Publication Data

US 2023/0341275 A1    Oct. 26, 2023

(30) Foreign Application Priority Data

Apr. 21, 2022    (KR) .................. 10-2022-0049490

(51) Int. Cl.
*G01K 7/42*    (2006.01)
*G01K 1/20*    (2006.01)
*G01K 7/22*    (2006.01)

(52) U.S. Cl.
CPC ............. *G01K 7/42* (2013.01); *G01K 1/20* (2013.01); *G01K 7/22* (2013.01)

(58) Field of Classification Search
None
See application file for complete search history.

(56) References Cited

U.S. PATENT DOCUMENTS

| 5,430,692 A | 7/1995 | Grupp et al. |
| 5,484,205 A | 1/1996 | Grupp et al. |
| 7,249,883 B2 | 7/2007 | Kuroda et al. |

(Continued)

FOREIGN PATENT DOCUMENTS

| JP | 2011-191163 A | 9/2011 |
| JP | 5898204 B2 | 4/2016 |

(Continued)

OTHER PUBLICATIONS

Apple Watch Series 8—technical specifications. Apple Support. (2022). https://support.apple.com/en-us/111848 (Year: 2022).*

(Continued)

*Primary Examiner* — Erica S Lin
(74) *Attorney, Agent, or Firm* — Sughrue Mion, PLLC

(57) ABSTRACT

An electronic device may include: a main body including a first surface and a second surface; a first temperature sensor and a second temperature sensor which are provided inside the main body, wherein the second temperature sensor is disposed closer to the surface of the main body than the first temperature sensor; and a processor, which while the second surface of the main body is in contact with a body part of a user, is configured to estimate a heat flux that is generated by body heat, of the user based on a difference between a first temperature measured by the first temperature sensor and a second temperature measured by the second temperature sensor, and measure air temperature based on the estimated heat flux and the second temperature.

19 Claims, 12 Drawing Sheets

(56) References Cited

U.S. PATENT DOCUMENTS

| | | |
|---|---|---|
| 7,299,090 B2 | 11/2007 | Koch |
| 8,716,629 B2 | 5/2014 | Klewer et al. |
| 9,341,519 B2 | 5/2016 | Goto |
| 9,354,122 B2 | 5/2016 | Bieberich et al. |
| 9,357,929 B2 | 6/2016 | Paquet |
| 9,671,296 B2 | 6/2017 | Niederberger et al. |
| 9,699,546 B2 | 7/2017 | Qian et al. |
| 9,716,937 B2 | 7/2017 | Qian et al. |
| 10,088,373 B2 | 10/2018 | Durrer et al. |
| 10,274,383 B2 | 4/2019 | Bieberich et al. |
| 10,368,811 B1 | 8/2019 | Bajaj et al. |
| 10,398,363 B2 | 9/2019 | Hayter et al. |
| 10,405,755 B2 | 9/2019 | Shrubsole et al. |
| 10,503,125 B2 | 12/2019 | Germiquet et al. |
| 10,668,206 B2 | 6/2020 | Newell et al. |
| 10,765,409 B2 | 9/2020 | Lafon et al. |
| 10,959,942 B2 | 3/2021 | Sandvang et al. |
| 11,071,814 B2 | 7/2021 | Newell et al. |
| 11,090,423 B2 | 8/2021 | Newell et al. |
| 11,090,424 B2 | 8/2021 | Newell et al. |
| 11,109,764 B2 | 9/2021 | Bongers et al. |
| 11,224,344 B2 | 1/2022 | Ellis et al. |
| 2007/0225614 A1 | 9/2007 | Naghavi et al. |
| 2018/0340844 A1 | 11/2018 | Jordan |
| 2019/0142280 A1* | 5/2019 | Bongers .............. A61B 5/0002 600/549 |
| 2019/0350462 A1 | 11/2019 | Biederman et al. |
| 2020/0060869 A1 | 2/2020 | Telfort et al. |
| 2020/0217727 A1 | 7/2020 | Heitz et al. |
| 2020/0408607 A1 | 12/2020 | Yee |
| 2021/0123819 A1 | 4/2021 | Seyama et al. |
| 2021/0353842 A1 | 11/2021 | Newell et al. |
| 2021/0404883 A1* | 12/2021 | Rahmani .................. G01K 7/00 |

FOREIGN PATENT DOCUMENTS

| | | |
|---|---|---|
| WO | 2017/001701 A1 | 1/2017 |
| WO | 2017/062923 A1 | 4/2017 |
| WO | 2021/057873 A1 | 4/2021 |

OTHER PUBLICATIONS

U.S. Appl. No. 17/409,242, filed Aug. 23, 2021.
U.S. Appl. No. 17/522,363, filed Nov. 9, 2021.

* cited by examiner

ELECTRONIC DEVICE AND METHOD OF MEASURING AIR TEMPERATURE USING THE SAME

CROSS-REFERENCE TO RELATED APPLICATION(S)

This application claims priority from Korean Patent Application No. 10-2022-0049490, filed on Apr. 21, 2022, in the Korean Intellectual Property Office, the disclosure of which is incorporated herein by reference in its entirety.

BACKGROUND

1. Field

Apparatuses and methods consistent with example embodiments relate to measuring air temperature using an electronic device.

2. Description of the Related Art

Temperature sensors for measuring air temperature may be divided into a contact type temperature sensor and a contactless temperature sensor. In an electronic device for measuring air temperature, a temperature sensor is generally exposed to the outside of the electronic device to measure air temperature. However, such structure has drawbacks in terms of waterproof properties and design. Accordingly, there is an increasing demand for sensors capable of measuring temperature while being embedded in the electronic device. However, when the temperature of the air surrounding a user is measured using the temperature sensor enclosed in the electronic device, body heat of the user wearing the electronic device is reflected, such that air temperature may not be measured accurately. Accordingly, it is highly required to offset the effect of body heat.

SUMMARY

According to an aspect of the disclosure, an electronic device may include: a main body including a first surface and a second surface; a first temperature sensor and a second temperature sensor which are provided inside the main body, wherein the second temperature sensor is disposed closer to the first surface of the main body than the first temperature sensor; and a processor, which while the second surface of the main body is in contact with a body part of a user, is configured to estimate a heat flux that is generated by body heat of the user, based on a difference between a first temperature measured by the first temperature sensor and a second temperature measured by the second temperature sensor, and measure air temperature based on the estimated heat flux and the second temperature.

The processor may be further configured to measure the air temperature by linearly combining the estimated heat flux and the second temperature.

The electronic device may further include: a first thermally conductive material directly disposed on the first temperature sensor, to face the second temperature sensor, with a gap between the first thermally conductive material and the second temperature sensor; and a second thermally conductive material directly disposed on the second temperature sensor to face the first surface of the main body, with a gap between the second thermally conductive material and the first surface, wherein the processor is further configured to compute a correction coefficient based on a resistance value of the first thermally conductive material, a resistance value of the second thermally conductive material, and a resistance value of the first surface of the main body, obtain a corrected heat flux by applying the correct coefficient to the estimated heat flux, and combining the corrected heat flux and the second temperature.

The processor is further configured to compute the correction coefficient based on a ratio between the resistance value of the first thermally conductive material and a sum of the resistance value of the second thermally conductive material and the resistance value of the first surface of the main body.

At least one of the first temperature sensor and the second temperature sensor may be a thermistor.

The first temperature sensor may be disposed at a vertical distance of 10 mm or less from the second surface of the main body.

The second temperature sensor may be disposed at a vertical distance of 10 mm or less below the first surface of the main body.

A distance between the first temperature sensor and the second temperature sensor may be in a range of 1 mm to 50 mm.

The electronic device may further include: a third temperature sensor disposed closer to the first surface of the main body than the second temperature sensor, wherein the processor may be further configured to estimate, as a first heat flux, the heat flux that is generated based on the difference between the first temperature and the second temperature measured, estimate a second heat flux based on a difference between the second temperature and a third temperature measured by the third temperature sensor, measure the air temperature based on the estimated first heat flux, and the estimated second heat flux, and the third temperature.

The electronic device may further include: a first thermally conductive material directly disposed on the first temperature sensor to face the second temperature sensor, with a gap between the first thermally conductive material and the second temperature sensor; a second thermally conductive material directly disposed on the second temperature sensor to face the first surface of the main body, with a gap between the second thermally conductive material and the first surface; and a third thermally conductive material directly disposed on the third temperature sensor to face the first surface of the main body, with a gap between the third thermally conductive material and the first surface, wherein the processor is further configured to compute the air temperature based on a resistance value of the first thermally conductive material, a resistance value of the second thermally conductive material, and a resistance value of the third thermally conductive material, the estimated first heat flux, the estimated second heat flux, and the third temperature.

The second temperature sensor may be attached to an electrical component in the main body, and is further configured to measure a temperature of heat generated from the electrical component.

The heat generated from the electrical component may be estimated based on a difference between the first heat flux and the second heat flux.

At least one of the first temperature sensor, the second temperature sensor, and the third temperature sensor may be a thermistor.

According to another aspect of the disclosure, there is provided a method of estimating air temperature by using an electronic device that includes a first temperature sensor and a second temperature sensor which are provided inside a main body of the electronic device, wherein the second temperature sensor is disposed closer to a first surface of the main body than the first temperature sensor. The method may include measuring a first temperature by using the first temperature sensor when the main body is in contact with a user; measuring a second temperature by using the second temperature sensor when the main body is in contact with the user; estimating a heat flux that is generated by body heat of the user, based on a difference between the first temperature and the second temperature; and measuring the air temperature based on the estimated heat flux and the second temperature.

The measuring of the air temperature may include measuring the air temperature by linearly combining the estimated heat flux and the second temperature.

The measuring of the air temperature may include: computing a correction coefficient based on a resistance value of a first thermally conductive material disposed between the first temperature sensor and the second temperature sensor, a resistance value of a second thermally conductive material disposed at an upper end of the second temperature sensor, and a resistance value of the first surface of the main body; obtaining a corrected heat flux by applying the correct coefficient to the estimated heat flux; and combining the corrected heat flux and the second temperature.

The measuring of the air temperature may include computing the correction coefficient based on a ratio between the resistance value of the first thermally conductive material and a sum of the resistance value of the second thermally conductive material and the resistance value of the first surface of the main body.

According to another aspect of the disclosure, a smart watch may include: a main body including a first surface and a second surface; a strap connected to both ends of the main body; a first temperature sensor and a second temperature sensor which are provided inside the main body; and a processor, which while the strap is wrapped around a wrist of a user such that the main body is worn on the wrist, is configured to estimate a heat flux that is generated by body heat of the user, based on a difference between a first temperature measured by the first temperature sensor and a second temperature measured by the second temperature sensor, and to measure air temperature based on the estimated heat flux and the second temperature.

The processor may be further configured to measure the air temperature by linearly combining the estimated heat flux and the second temperature.

The smart watch may further include: a first thermally conductive material directly disposed on the first temperature sensor, to face the second temperature sensor; and a second thermally conductive material directly disposed on the second temperature sensor to face the first surface of the main body, with a gap between the second thermally conductive material and the first surface, wherein the processor may be further configured to compute a correction coefficient based on a resistance value of the first thermally conductive material, a resistance value of the second thermally conductive material, and a resistance value of the first surface of the main body, obtain a corrected heat flux by applying the correct coefficient to the estimated heat flux, and combining the corrected heat flux and the second temperature.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
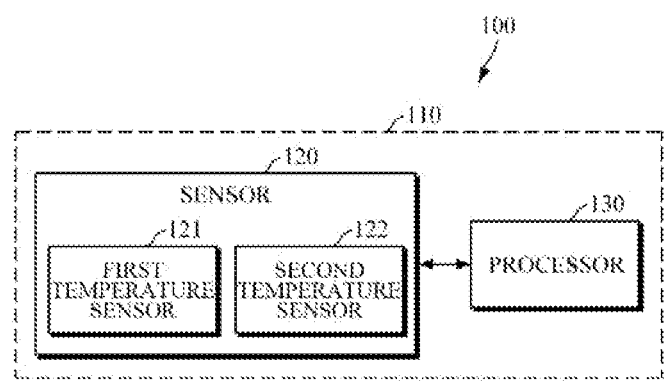
FIG. 1 is a block diagram illustrating an electronic device according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a PDA, a portable multimedia player (PMP), an MP3 player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various portable medical measuring devices (antioxidant measuring device, blood glucose monitor, heart rate monitor, blood pressure measuring device, thermometer, etc.), magnetic resonance angiography (MRA), magnetic resonance imaging (MRI), computed tomography (CT), imaging system, ultrasonic system, etc.), and the like. However, the electronic device is not limited to the above devices.

Figure 2:
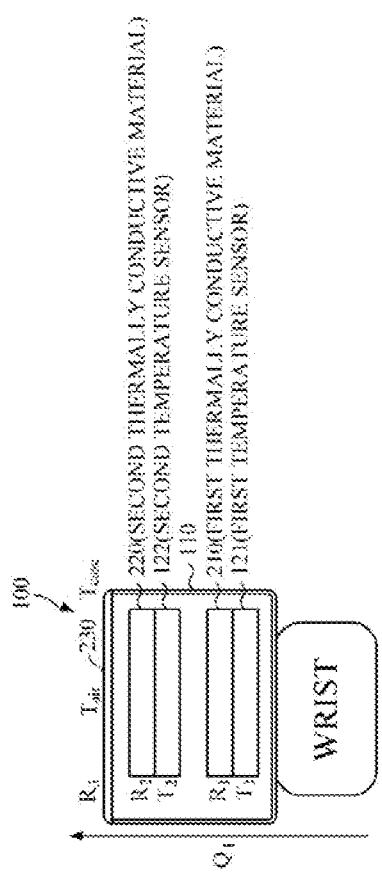
FIG. 2 is a diagram illustrating an example of a structure of an electronic device.

FIG. 1 is a block diagram illustrating an electronic device according to an embodiment of the present disclosure. FIG. 2 is a diagram illustrating an example of a structure of an electronic device.

Referring to FIG. 1, an electronic device 100 may include a sensor 120, a processor 130 which are disposed in a main body 110 of the electronic device 100. The sensor 120 may include a plurality of temperature sensors to obtain temperature data for estimating air temperature, and the processor 130 may estimate air temperature by using the temperature data obtained by the sensor 120. Here, the air temperature may include an ambient temperature outside the main body 110.

The sensor 120 may include a first temperature sensor 121 and a second temperature sensor 122 which may be disposed at different positions in the main body 110. For example, the main body 110 may include a first surface and a second surface, and the second temperature sensor 122 is disposed closer to the first surface of the main body than the first temperature sensor 121. In this case, the first surface and the second surface may be an upper surface and a lower surface, respectively, of the main body 110. For example, the first temperature sensor 121 may be disposed at a vertical distance (e.g., a distance in a thickness direction) of 10 mm or less from a contact surface between the main body 110 and a portion of a user's body; and the second temperature sensor 122 may be disposed at a vertical distance of 10 mm or less below the upper surface of the main body 110. In addition, a distance between the first temperature sensor 121 and the second temperature sensor 122 may be in a range of 1 mm to 50 mm. According to another embodiment, the first temperature sensor 121 and the second temperature sensor 122 may be disposed to face each other in a straight line. Further, the first temperature sensor 121 and the second temperature sensor 122 may be attached to a structure (e.g., main board) in the main body 110, at positions spaced apart from each other. However, the arrangement of the first temperature sensor 121 and the second temperature sensor 122 is not limited thereto. The first temperature sensor 121 and/or the second temperature sensor 122 may include a thermistor.

Referring to FIG. 2, the second temperature sensor 122 may be disposed over the first temperature sensor 121. In addition, a first thermally conductive material 210 may be disposed at an upper end of the first temperature sensor 121, which is a portion between the first temperature sensor 121 and the second temperature sensor 122, and a second thermally conductive material 220 may be disposed at an upper end of the second temperature sensor 122.

The first thermally conductive material 210 and/or the second thermally conductive material 220 may be an insulator (e.g., polyurethane foam) having a thickness of 0.1 mm to 20 mm and thermal conductivity of 0.1 W/mK or lower. In addition, without using a separate material, air having a very low thermal conductivity may be filled in a space between the first temperature sensor 121 and the second temperature sensor 122 and/or at the upper end of the second temperature sensor 122.

In another embodiment, the first thermally conductive material 210 and the second thermally conductive material 220 may refer to the entire space including air and structures in the electronic device. For example, the first thermally conductive material 210 may refer to the entire space including air and/or structures between the first temperature sensor 121 and the second temperature sensor 122, and the second thermally conductive material 220 may refer to the entire space including air and/or structures between the upper end of the second temperature sensor 122 and the upper surface of the main body. In particular, the first thermally conductive material 210 and the second first thermally conductive material 220 may have thermal conductivity of 10 W/mK or lower.

The main body 110 may be of a wearable type which may be worn on a user's body part (e.g., wrist), and may be a smartphone type device which may be carried by a user.

While the main body 110 is worn on a user's body part or a user carries the main body 110, the processor 130 may measure a first temperature by using the first temperature sensor 121 and a second temperature by using the second temperature sensor 122, and may measure air temperature based on the measured temperatures. For example, the processor 130 may estimate a heat flux generated by body heat based on a temperature difference between the first temperature and the second temperature, and may estimate the air temperature based on the estimated heat flux and the second temperature.

First, the processor 130 may estimate the heat flux by using the first temperature sensor 121 and the second temperature sensor 122 included in the main body 110. Assuming that a flow of heat is a current, a heat transfer property of a material is resistance, and a heat flux is a voltage, the flow of heat may be expressed by an equation according to Bohr's law (V=IR). For example, assuming that heat transfer from the wrist to the top of the main body occurs in a series circuit and the heat flux is $Q_1$, a temperature difference between an object's wrist temperature Twrist and the first temperature $T_1$, a temperature difference between the first temperature $T_1$ and the second temperature $T_2$, a temperature difference between the second temperature $T_2$ and a temperature $T_{case}$ of the upper surface of the main body, and a temperature difference between the temperature $T_{case}$ of the upper surface of the main body and air temperature $T_{air}$ at the top of the main body may be estimated based on the heat flux $Q_1$. In particular, as for the flow of heat at the inner portion and the top of the main body 110, the following Equation 1 may be derived based on Bohr's law (V=IR).

$$\frac{T_{case} - T_{air}}{R_3} = \frac{T_2 - T_{case}}{R_2} = \frac{T_1 - T_2}{R_1} \quad \text{[Equation 1]}$$

Herein, $R_1$ denotes a resistance value of the first thermally conductive material 210, $R_2$ denotes a resistance value of the second thermally conductive material 220, and $R_3$ denotes a resistance value of an upper surface 230 of the main body. Assuming that heat leaks from the side of the main body 110, a temperature calculation based on Equation 1 may not be accurate, and the respective terms in the equation are in a proportional relationship and may be multiplied by predetermined coefficients.

The temperature $T_{case}$ of the upper surface of the main body and the air temperature $T_{air}$ at the top of the main body may be represented by the following Equations 2 and 3.

$$T_{case} = T_2 - \frac{R_2}{R_1}(T_1 - T_2) \quad \text{[Equation 2]}$$

$$T_{air} = T_{case} + \frac{R_3}{R_2}(T_{case} - T_2) \quad \text{[Equation 3]}$$

Then, by substituting Equation 2 into Equation 3, the air temperature $T_{air}$ at the top of the main body may be represented by the following Equation 4.

$$T_{air} = T_2 - \frac{R_2 + R_3}{R_1}(T_1 - T_2) = T_2 - \beta(T_1 - T_2) \quad \text{[Equation 4]}$$

Herein, β denotes a correction coefficient and thermal conductivity according to physical properties. The processor 130 may calculate the correction coefficient based on a resistance value $R_1$ of the first thermally conductive material 210, a resistance value $R_2$ of the second thermally conductive material 220, and a resistance value $R_3$ of the upper surface 230 of the main body 110. For example, the processor 130 may calculate the correction coefficient based on a ratio between the resistance value $R_1$ of the first thermally conductive material 210 and a sum of the resistance value $R_2$ of the second thermally conductive material 220 and the resistance value $R_3$ of the upper surface 230 of the main body 110. The calculated correction coefficient may be pre-stored in a storage of the electronic device 100.

That is, as shown in the above Equation 4, the processor 130 may measure the air temperature $T_{air}$ at the top of the main body by combining the second temperature $T_2$ with a result obtained by applying the correction coefficient β to the heat flux $Q_1$ estimated based on the difference $T_1-T_2$ between the first temperature and the second temperature.

Generally, when ambient air temperature around a user is measured using a temperature sensor of an electronic device, it is difficult to measure the air temperature accurately due to body heat of the user being in contact with the electronic device. The above embodiment of the present disclosure provides a method of estimating a heat flux from a user by using a plurality of temperature sensors and estimating air temperature based on the estimated heat flux, in which by offsetting the effect of body heat, the accuracy of estimating air temperature may be improved.

Figure 3:
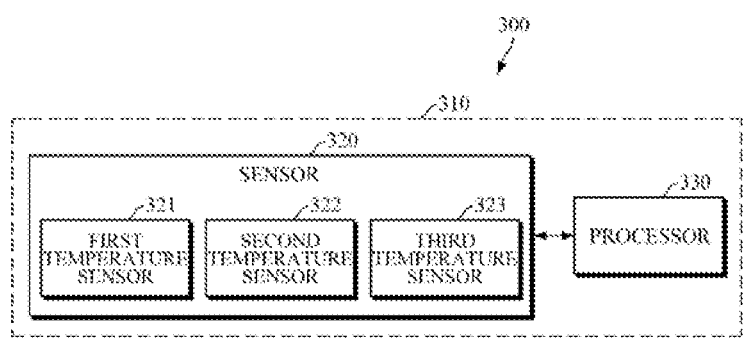
FIG. 3 is a block diagram illustrating an electronic device including three temperature sensors provided therein according to another example embodiment of the present disclosure.
Figure 4:
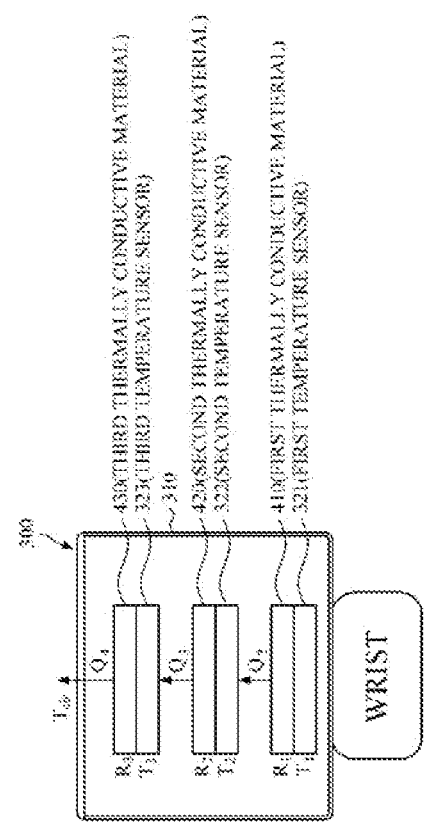
FIG. 4 is a diagram illustrating an example of a structure of the electronic device of FIG. 3.

FIG. 3 is a block diagram illustrating an electronic device including three temperature sensors provided therein according to another embodiment of the present disclosure, and FIG. 4 is a diagram illustrating an example of a structure of the electronic device of FIG. 3.

Referring to FIGS. 3 and 4, a main body 310 of an electronic device 300 may include a sensor 320 and a processor 330, in which the sensor 320 may include a first temperature sensor 321, a second temperature sensor 322, and a third temperature sensor 323.

In the main body 310, the second temperature sensor 322 may be disposed over the first temperature sensor 321, and the third temperature sensor 323 may be disposed over the second temperature sensor. Further, a first thermally conductive material 410 may be disposed between the first temperature sensor 321 and the second temperature sensor 322; a second thermally conductive material 420 may be disposed between the second temperature sensor 322 and the third temperature sensor 323; and a third thermally conductive material 430 may be disposed at an upper end of the third temperature sensor 323. At least one of the first temperature sensor 321, the second temperature sensor 322, and the third temperature sensor 323 may be implemented as a thermistor, and at least one of the first thermally conductive material 410, the second thermally conductive material 420, and the third thermally conductive material 430 may include air.

In particular, the second temperature sensor 322 may be attached to a structure (e.g., an internal component of the electronic device 300, such as a main board) in the main body 310, such that the second temperature sensor 322 may further measure temperature of heat generated from the structure.

While the main body is worn on a user's body part or while the user carries the main body, the processor 330 may measure a first temperature by using the first temperature sensor 321, a second temperature by using the second temperature sensor 322, and a third temperature by using the third temperature sensor 323, and may measure air temperature based on the measured temperatures. For example, the processor 330 may estimate a first heat flux $Q_2$ generated by body heat based on the difference $T_1-T_2$ between the first temperature and the second temperature, may estimate a second heat flux $Q_3$ from the body heat based on the difference $T_2-T_3$ between the second temperature and the third temperature, and may measure the air temperature based on the estimated first heat flux $Q_2$ and second heat flux $Q_3$, and the third temperature.

First, when heat is generated from an internal component of the electronic device 300 to which the second temperature sensor 322 is attached thereto, a heat flux flowing through the second temperature sensor 322 from the wrist toward the top of the main body may not be constant, such that there is a difference between the first heat flux $Q_2$ and the second heat flux $Q_3$. For example, due to the heat generated from the structure, the first heat flux $Q_2$ may relatively increase, and the second heat flux $Q_3$ may relatively decrease, which may be expressed by the following Equation 5 according to Bohr's law.

$$\frac{T_1 - T_2}{R_1} > \frac{T_2 - T_3}{R_2} \quad \text{[Equation 5]}$$

In particular, by reflecting the heat $T_{in}$, which is generated from the structure, in Equation 5, a flow of heat from the wrist may be expressed by the following Equation 6, in which a third heat flux $Q_4$ estimated based on a difference $T_3-T_{air}$ between the third temperature and the air temperature at the top of the main body is included.

$$\frac{T_1 - T_2 - T_{in}}{R_1} = \frac{T_2 - T_3 + T_{in}}{R_2} = \frac{T_3 - T_{air}}{R_3} \quad \text{[Equation 6]}$$

Herein, $R_1$ denotes the resistance value of the first thermally conductive material 410, $R_2$ denotes the resistance value of the second thermally conductive material 420, and $R_3$ denotes the resistance value of the third thermally conductive material 430.

Assuming that heat leaks from the side of the main body 310, a temperature calculation based on Equation 6 may not be accurate, and the respective terms in the equation are in a proportional relationship and may be multiplied by predetermined coefficients.

By using the above Equation 6, the heat $T_{in}$ generated from the structure and the air temperature $T_{air}$ at the top of the main body may be expressed by the following Equations 7 and 8, respectively.

$$T_{in} = \frac{R_2(T_1 - T_2) - R_1(T_2 - T_3)}{R_1 + R_2} \qquad \text{[Equation 7]}$$

$$T_{air} = T_3 - \frac{R_3}{R_2}(T_2 - T_3 + T_{in}) \qquad \text{[Equation 8]}$$

Then, by substituting Equation 7 into Equation 8, the air temperature $T_{air}$ at the top of the main body may be expressed by the following Equation 9.

$$T_{air} = T_3 - \frac{R_3}{R_2}\left(T_2 - T_3 + \frac{R_2(T_1 - T_2) - R_1(T_2 - T_3)}{R_1 + R_2}\right) \qquad \text{[Equation 9]}$$

Based on the above Equation 7, the processor 330 may estimate the temperature $T_{in}$ of the heat generated from the structure in the main body in real time based on a difference between the first heat flux $Q_2$, estimated based on the difference $T_1-T_2$ between the first temperature and the second temperature, and the second heat flux $Q_3$ estimated based on the difference $T_2-T_3$ between the second temperature and the third temperature. In addition, according to the above Equation 9, the processor 330 may reflect the temperature $T_{in}$ of the heat generated from the structure in the main body, and may measure the air temperature based on the resistance value $R_1$ of the first thermally conductive material, the resistance value $R_2$ of the second thermally conductive material, and the resistance value $R_3$ of the third thermally conductive material, and the estimated first heat flux $Q_2$ and second heat flux $Q_2$, and the third temperature $T_3$. In this case, the resistance value $R_1$ of the first thermally conductive material, the resistance value $R_2$ of the second thermally conductive material, and the resistance value $R_3$ of the third thermally conductive material may be pre-stored in the storage.

Generally, when an electronic device is used, heat may also be generated from structures included in a main body of the electronic device. According to the above embodiment of the present disclosure, not only the effect of a user's body heat, but also the effect of heat generated from the structures may be offset, thereby improving the accuracy of estimating the air temperature.

Figure 5:
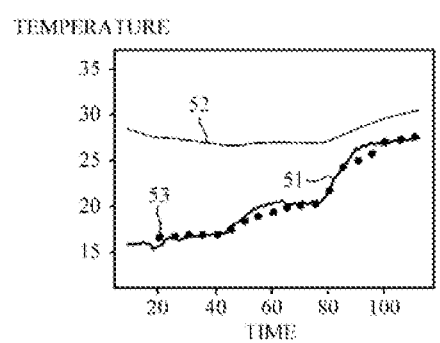
FIG. 5 is a diagram illustrating a relationship between air temperature measured by using a plurality of temperature sensors provided in a wearable device, air temperature measured by using a temperature sensor disposed outside of a wearable device, and an actual air temperature.

FIG. 5 is a diagram illustrating a relationship between air temperature, measured by using a plurality of temperature sensors while a wearable device is worn according to the above embodiment in which the effect of body heat is offset, air temperature measured by using a temperature sensor disposed adjacent to the outside in a main body of a wearable device, and an actual air temperature.

For example, referring to FIG. 5, an error between a predicted air temperature value 51 over time in a case in which the effect of body heat is offset and an actually measured air temperature 53 is 0.14° C., and an error between a temperature value 52 measured over time in a case in which a temperature sensor in a smart watch is disposed adjacent to the outside, and the actually measured air temperature 53 is 6.81° C. Based on the results, it can be seen that the predicted air temperature value 51 in a case in which the effect of the body heat is offset is closer to the actually measured air temperature 53.

Figure 6:
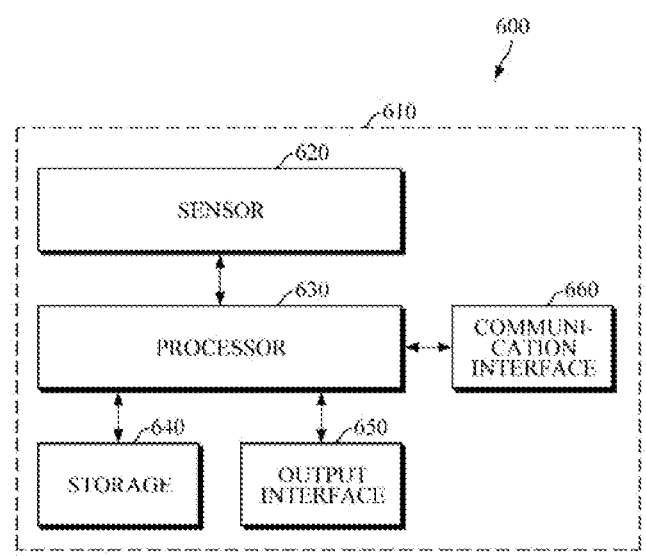
FIG. 6 is a block diagram illustrating an electronic device according to another example embodiment of the present disclosure.

FIG. 6 is a block diagram illustrating an electronic device for estimating air temperature according to another embodiment of the present disclosure.

Referring to FIG. 6, an electronic device 600 may include a sensor 620, a processor 630, a storage (e.g., a memory) 640, an output interface 650, and a communication interface 660 in a main body 610. In this case, the configuration of the sensor 620 and the processor 630 is substantially the same as the sensors 120 and 320 and the processors 130 and 330 in the embodiments of FIGS. 1 and 3, such that a detailed description thereof will be omitted.

The storage 640 may store information related to estimating air temperature. For example, the storage 640 may store temperature data measured by the sensor 620, resistance values of thermally conductive materials, equations for calculating air temperature (e.g., Equations 8-9) and processing results of the processor 630, such as heat flux, estimated air temperature values, and the like.

The storage 640 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 650 may provide processing results of the processor 630 for a user. For example, the output interface 650 may display a measured air temperature value of the processor 630 on a display. In particular, the output interface 650 may provide the user with information by changing color, line thickness, etc., so that the user may easily recognize the measured air temperature value. In addition, along with or without the visual display, the output interface 650 may provide the user with temperature guidance information in a non-visual manner by voice, vibrations, tactile sensation, and the like using an audio output module such as a speaker and the like, or a haptic module.

The communication interface 660 may communicate with an external device to transmit and receive various data related to estimating air temperature. The external device may include an information processing device, such as a smartphone, a tablet PC, a desktop computer, a laptop computer, and the like. For example, the communication interface 660 may transmit an air temperature measurement result to the external device, such as a smartphone and the like, and a user may monitor the air temperature over time by using the smartphone.

The communication interface 660 may communicate with the external device by using various wired and wireless communication techniques including Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, the communication techniques are not limited thereto.

Figure 7:
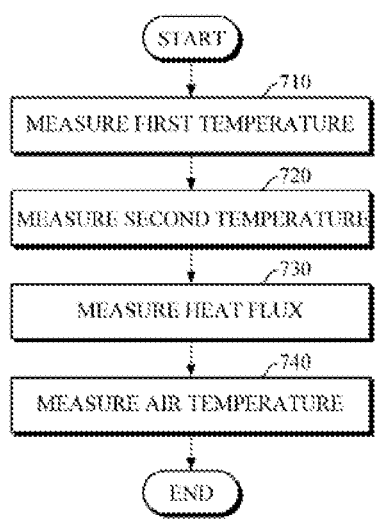
FIG. 7 is a flowchart illustrating a method of estimating air temperature according to an example embodiment of the present disclosure.

FIG. 7 is a flowchart illustrating a method of estimating air temperature according to an embodiment of the present disclosure.

The method of FIG. 7 is an example of a method of estimating air temperature performed by the electronic device 100 according to the embodiments of FIGS. 1 and 2, which are described in detail above, and thus will be briefly described below in order to avoid redundancy.

Referring to FIG. 7, the electronic device may measure a first temperature by using the first temperature sensor in the main body in operation 710, and may measure a second temperature by using a second temperature sensor which is disposed at a position different from the first temperature sensor, in operation 720.

Then, the electronic device may estimate a heat flux generated by body heat based on a difference between the measured first temperature and second temperature in operation 730. For example, the electronic device may estimate the heat flux based on a value, obtained by subtracting the second temperature from the first temperature measured using a heat flow expressed by an equation according to Bohr's law (V=IR).

Subsequently, the electronic device may measure air temperature based on the estimated heat flux and the second temperature in operation 740. For example, the electronic device may measure the air temperature by combining a result, obtained by applying a correction coefficient to the estimated heat flux, with the second temperature. In particular, the correction coefficient may be calculated based on a resistance value of the first thermally conductive material disposed between the first temperature sensor and the second temperate sensor, a resistance value of the second thermally conductive material disposed at an upper end of the second temperature sensor, and a resistance value of an upper surface of the main body. For example, the electronic device may calculate the correction coefficient based on a ratio between the resistance value of the first thermally conductive material and a sum of the resistance value of the second thermally conductive material and the resistance value of the upper surface of the main body. The electronic device may measure the air temperature in real time while the first temperature sensor and the second temperature sensor measures the first temperature and the second temperature, respectively.

FIGS. 8 to 11 are diagrams illustrating examples of structures of an electronic device including an apparatus for estimating air temperature. Examples of the electronic device may include not only a smartphone, but also a smart watch, a smart band, smart glasses, a smart necklace, and an ear-wearable device, but the electronic device is not limited thereto.

Figure 8:
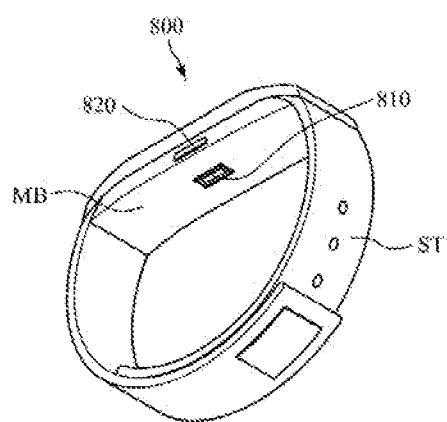
FIGS. 8 to 11 are diagrams illustrating examples of structures of an electronic device for estimating air temperature.

Referring to FIG. 8, the electronic device may be implemented as a smart watch-type wearable device 800 which includes a main body MB and a wrist strap ST.

The main body MB may be formed in various shapes. A battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap are connected to both sides of the main body MB, and the other ends thereof may be connected to each other via a fastening means. In particular, the connecting means may be formed as magnetic fastening, Velcro fastening, pin fastening, and the like, but is not limited thereto. Further, the strap ST is not limited thereto, and may be integrally formed as a non-detachable band.

The main body MB may include a sensor 810, a processor, a display device, an output interface, a storage, and a communication interface. However, depending on the size and shape of a form factor and the like, some of the display device, the storage, and the communication interface may be omitted.

A manipulator 820 may be formed on a side surface of the main body MB, as illustrated herein. The manipulator 820 may receive a user's command and may transmit the received command to the processor. In addition, the manipulator 820 may have a power button to turn on/off the wearable device 800.

The sensor 810 may include temperature sensors disposed at different positions and attached to structures in the main body. In addition, at least one of the plurality of temperature sensors may be a thermistor.

The processor mounted in the main body MB may be electrically connected to various components including the sensor 810. For example, the processor may estimate a heat flux generated by body heat based on a difference between a first temperature, measured by a first temperature sensor, and a second temperature, measured by a second temperature, in the main body MB and may measure air temperature based on the estimated heat flux and the second temperature. For example, the processor may measure the air temperature by combining a result, obtained by applying a correction coefficient to the estimated heat flux, with the second temperature. Meanwhile, a first thermally conductive material may be disposed between the first temperature sensor and the second temperature sensor, and a second thermally conductive material may be disposed at an upper end of the second temperature sensor. The processor may calculate the correction coefficient based on a resistance value of the first thermally conductive material, a resistance value of the second thermally conductive material, and a resistance value of an upper surface of the main body, and the resistance values may be pre-stored in the storage of the main body MB.

Figure 9:
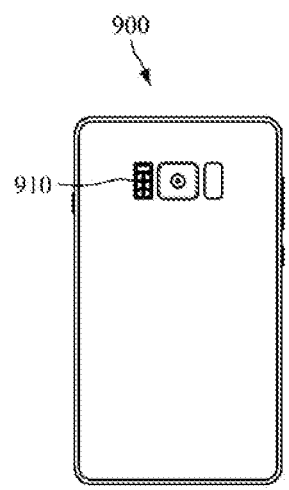

Referring to FIG. 9, the electronic device may be implemented as a mobile device 900 such as a smartphone.

The mobile device 900 may include a housing and a display panel. The housing may form an outer appearance of the mobile device 900. The housing has a first surface, on which a display panel and a cover glass may be disposed sequentially, and the display panel may be exposed to the outside through the cover glass. A sensor 910, a camera module and/or an infrared sensor, and the like may be disposed on a second surface of the housing.

For example, a plurality of temperature sensors for obtaining data from a user may be disposed on a rear surface of the mobile device 900, and a fingerprint sensor disposed on the front surface thereof, a power button or a volume button disposed on a side surface thereof, a sensor disposed on other positions of the front and rear surfaces thereof, and the like may be provided to estimate air temperature.

In addition, when a user transmits a request for estimating air temperature by executing an application and the like installed in the mobile device 900, the mobile device 900 may obtain data by using the sensor 910, and may measure the air temperature and may provide the measured value and temperature guidance information to the user through a display by using the processor in the mobile device 900.

Figure 10:
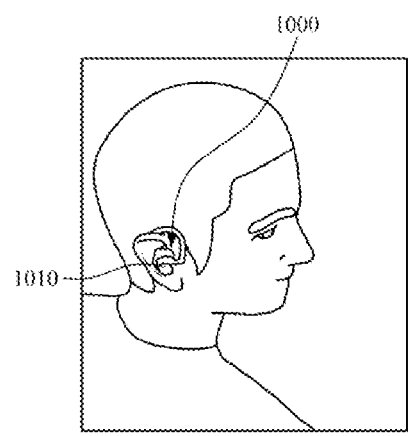

Referring to FIG. 10, the electronic device may be implemented as an ear-wearable device 1000.

The ear-wearable device 1000 may include a main body and an ear strap. A user may wear the ear-wearable device 1000 by hanging the ear strap on the user's auricle. The ear strap may be omitted depending on the shape of ear-wearable device 1000. The main body may be inserted into the external auditory meatus. A sensor 1010 may be mounted in the main body. The ear-wearable device 1000 may provide a user with an air temperature measurement result and/or air temperature guidance information as sound, or may transmit the information to an external device, e.g., a mobile device, a tablet PC, a personal computer, etc., through a communication module provided in the main body.

Figure 11:
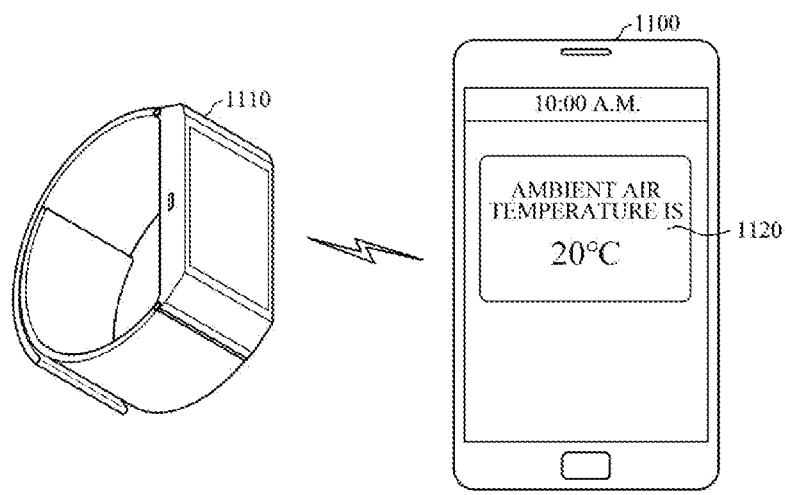

Referring to FIG. 11, the electronic device may be implemented as a combination of a wristwatch-type wearable device and a smartphone. For example, a processor for estimating air temperature may be mounted in a main body of the smartphone 1100. Upon receiving a request for measuring air temperature, the processor of the smartphone 1100 may control a communication interface to communicate with a communication module mounted in the main body of the wearable device 1110, to obtain data. Further, upon receiving temperature data from the wearable device 1110, the processor may estimate air temperature, and may output a message 1120, "ambient air temperature is 20° C.," on a display of the smartphone 1100, as illustrated herein.

Figure 12:
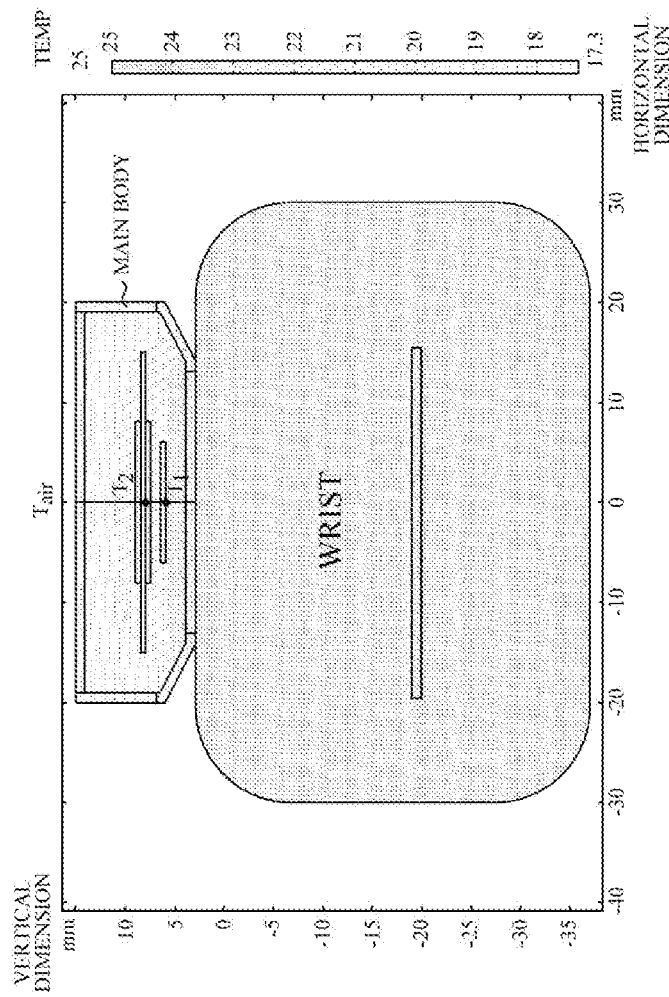
FIG. 12 illustrates a simulation result of estimating air temperature according to an example embodiment of the present disclosure.

FIG. 12 illustrates a simulation result of estimating an air temperature according to an example embodiment of the present disclosure.

As shown in FIG. 12, a main body of an electronic device includes an upper surface and a lower surface. When the lower surface is in contact with a user's wrist, the body heat of the user may be conveyed to the lower surface of the main body, and then may transfer from the lower surface to the upper surface of the main body.

Referring to FIG. 12, the main body may include a first temperature sensor T1 and a second temperature sensor T2 that are arranged in a vertical direction (e.g., a thickness direction) of the main body. In the main body, the first temperature sensor may be disposed at a vertical distance of 10 mm or less from the lower surface of the main body (e.g., a contact surface between the main body and the user's wrist), the second temperature sensor may be disposed at a vertical distance of 10 mm or less below the upper surface of the main body, and the first temperature sensor T1 and the second temperature sensor T2 are spaced apart from each other by a distance of 1 mm to 50 mm. A first thermally conductive material and a second thermally conductive material (e.g., polyurethane foam) may be disposed on the first temperature sensor T1 and the second temperature sensor T2, respectively. Each of the first thermally conductive material and the second thermally conductive material may have a thickness of 0.1 mm to 20 mm and a thermal conductivity of 0.1 W/mK or lower.

When the main body of the electronic device includes the first temperature sensor T1, the second temperature sensor T2, the first thermally conductive material, and the second thermally conductive material that are configured and arranged as shown in FIG. 12, the electronic device may be capable of estimating an air temperature at a high accuracy as shown in the following table:

| Temperature Sensor T1 | Temperature Sensor T2 | Actual Air Temperature | Estimated Air Temperature |
|---|---|---|---|
| 21.18° C. | 22.36° C. | 15° C. | 15° C. |
| 24.94° C. | 25.89° C. | 20° C. | 20.12° C. |
| 29.33° C. | 30.16° C. | 25° C. | 25.03° C. |
| 32.47° C. | 32.95° C. | 30° C. | 30.02° C. |

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
    a main body comprising a first surface and a second surface;
    a first temperature sensor and a second temperature sensor which are provided inside the main body, wherein the second temperature sensor is disposed closer to the first surface of the main body than the first temperature sensor;
    a first thermally conductive material disposed on the first temperature sensor, to face the second temperature sensor, with a gap between the first thermally conductive material and the second temperature sensor;
    a second thermally conductive material disposed on the second temperature sensor to face the first surface of the main body, with a gap between the second thermally conductive material and the first surface; and
    a processor, which while the second surface of the main body is in contact with a body part of a user, is configured to;
        estimate a heat flux that is generated by body heat of the user, based on a difference between a first temperature measured by the first temperature sensor and a second temperature measured by the second temperature sensor;
        compute a correction coefficient based on a resistance value of the first thermally conductive material, a resistance value of the second thermally conductive material, and a resistance value of the first surface of the main body;

obtain a corrected heat flux by applying the correction coefficient to the estimated heat flux; and
measure air temperature based on the corrected heat flux and the second temperature.

2. The electronic device of claim 1, wherein the processor is further configured to measure the air temperature by linearly combining the corrected heat flux and the second temperature.

3. The electronic device of claim 1, wherein:
a first thermally conductive material is directly disposed on the first temperature sensor; and
a second thermally conductive material is directly disposed on the second temperature sensor.

4. The electronic device of claim 3, wherein the processor is further configured to compute the correction coefficient based on a ratio between the resistance value of the first thermally conductive material and a sum of the resistance value of the second thermally conductive material and the resistance value of the first surface of the main body.

5. The electronic device of claim 1, wherein at least one of the first temperature sensor and the second temperature sensor is a thermistor.

6. The electronic device of claim 1, wherein the first temperature sensor is disposed at a vertical distance of 10 mm or less from the second surface between the main body and the body part of the user.

7. The electronic device of claim 1, wherein the second temperature sensor is disposed at a vertical distance of 10 mm or less below the first surface of the main body.

8. The electronic device of claim 1, wherein a distance between the first temperature sensor and the second temperature sensor is in a range of 1 mm to 50 mm.

9. A method of estimating air temperature by using an electronic device that comprises a first temperature sensor and a second temperature sensor which are provided inside a main body of the electronic device, wherein the second temperature sensor is disposed closer to a first surface of the main body than the first temperature sensor, the method comprising:
measuring a first temperature by using the first temperature sensor when the main body is in contact with a user;
measuring a second temperature by using the second temperature sensor when the main body is in contact with the user;
estimating a heat flux that is generated by body heat of the user, based on a difference between the first temperature and the second temperature;
computing a correction coefficient based on a resistance value of a first thermally conductive material disposed on the first temperature sensor, to face the second temperature sensor, with a gap between the first thermally conductive material and the second temperature sensor, a resistance value of a second thermally conductive material disposed on the second temperature sensor to face the first surface of the main body, with a gap between the second thermally conductive material and the first surface;
obtaining a corrected heat flux by applying the correction coefficient to the estimated heat flux; and
measuring the air temperature based on the corrected heat flux and the second temperature.

10. The method of claim 9, wherein the measuring of the air temperature comprises measuring the air temperature by linearly combining the corrected heat flux and the second temperature.

11. The method of claim 9, wherein the measuring of the air temperature comprises computing the correction coefficient based on a ratio between the resistance value of the first thermally conductive material and a sum of the resistance value of the second thermally conductive material and the resistance value of the first surface of the main body.

12. The electronic device of claim 1, further comprising:
a third temperature sensor disposed closer to the first surface of the main body than the second temperature sensor,
wherein the processor is configured to estimate the corrected heat flux as a first heat flux, estimate a second heat flux based on a difference between the second temperature and a third temperature measured by the third temperature sensor, measure the air temperature based on the first heat flux, and the second heat flux, and the third temperature.

13. The electronic device of claim 12, further comprising:
a third thermally conductive material directly disposed on the third temperature sensor to face the first surface of the main body, with a gap between the third thermally conductive material and the first surface,
wherein the processor is further configured to compute the air temperature based on the resistance value of the first thermally conductive material, the resistance value of the second thermally conductive material, and a resistance value of the third thermally conductive material, the first heat flux, the second heat flux, and the third temperature.

14. The electronic device of claim 12, wherein the second temperature sensor is attached to an electrical component in the main body, and is further configured to measure a temperature of heat generated from the electrical component.

15. The electronic device of claim 14, wherein the heat generated from the electrical component is estimated based on a difference between the first heat flux and the second heat flux.

16. The electronic device of claim 12, wherein at least one of the first temperature sensor, the second temperature sensor, and the third temperature sensor is a thermistor.

17. A smart watch comprising:
a main body comprising a first surface and a second surface;
a strap connected to both ends of the main body;
a first temperature sensor and a second temperature sensor which are provided inside the main body;
a first thermally conductive material disposed on the first temperature sensor, to face the second temperature sensor, with a gap between the first thermally conductive material and the second temperature sensor;
a second thermally conductive material disposed on the second temperature sensor to face the first surface of the main body, with a gap between the second thermally conductive material and the first surface; and
a processor, which while the strap is wrapped around a wrist of a user such that the main body is worn on the wrist, is configured to;
estimate a heat flux that is generated by body heat of the user, based on a difference between a first temperature measured by the first temperature sensor and a second temperature measured by the second temperature sensor;
compute a correction coefficient based on a resistance value of the first thermally conductive material, a resistance value of the second thermally conductive material, and a resistance value of the first surface of the main body;

obtain a corrected heat flux by applying the correction coefficient to the estimated heat flux; and to measure air temperature based on the corrected heat flux and the second temperature.

18. The smart watch of claim 17, wherein the processor is further configured to measure the air temperature by linearly combining the corrected heat flux and the second temperature.

19. The smart watch of claim 18, wherein the first thermally conductive material is directly disposed on the first temperature sensor; and the second thermally conductive material is directly disposed on the second temperature sensor.

* * * * *